United States Patent Office 3,644,472
Patented Feb. 22, 1972

3,644,472
PREPARATION OF UNSATURATED ALIPHATIC NITRILES
Teo Paleologo, Cesare Reni, and Luigi Lugo, Milan, Italy, assignors to Societá Italiana Resine S.p.A., Milan, Italy
Filed July 25, 1968, Ser. No. 747,733
Claims priority, application Italy, Aug. 1, 1967, 19,063/67
Int. Cl. C07c *121/02, 121/32*
U.S. Cl. 260—465.3                                      4 Claims

ABSTRACT OF THE DISCLOSURE

An olefin is oxidized in the presence of ammonia in a fluidized catalytic bed in a reactor having a specific structure operating in specific conditions. The structure comprises a plurality of heat-exchange tubes vertically extending through the catalytic bed, the tubes comprising external ribs or fins subdividing the bed into a plurality of vertically extending intercommunicating component beds in which a specific "real" height-to-diameter ratio is established in operation.

---

Figure 1:
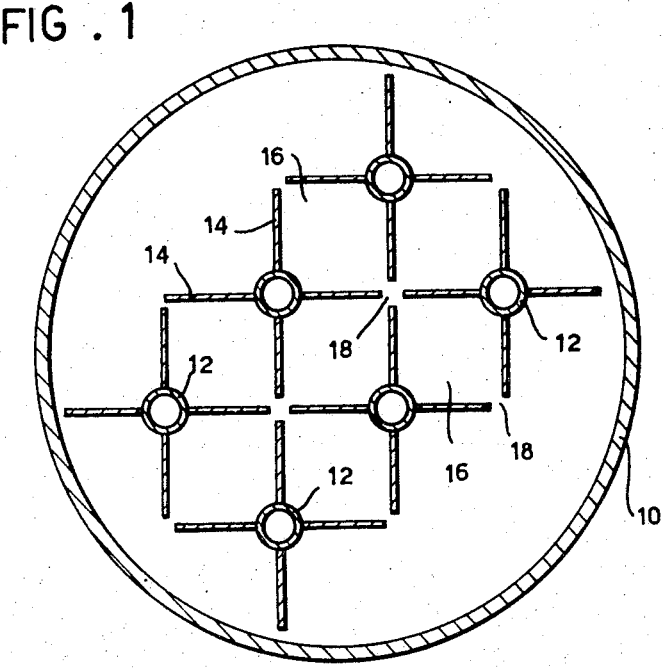

The present invention relates to an apparatus and a process useful for preparing unsaturated aliphatic nitriles by catalytic oxidation of the olefins in the presence of ammonia. More particularly, the invention relates to apparatus and a process in which the oxidation is carried out while maintaining the catalyst in a fluidized condition.

It is known that reaction of lower mono-olefins with oxygen and ammonia in the presence of suitable ammoxidation catalysts yields unsaturated aliphatic nitriles. Thus, when the olefin is propylene, acrylonitrile is obtained, whereas isobutene will yield methacrylonitrile.

Ammoxidation catalysts whether supported or unsupported, useful for the purpose include a number of elements of the periodic system which may be variously combined in the form of oxides or salts. In this connection bismuth, tin and antimony in the form of salts of molybdic, phosphomolybdic and phosphotungstic acids, or the combinations of two or more of oxides of molybdenum, cobalt, tellurium, chromium, vanadium, manganese, nickel, copper, iron, selenium, bismuth and the like may be mentioned.

Various oxidation processes are known in the art, in which the reagents in gaseous form are fed to a catalytic bed in a fixed or fluidized state. When the fixed bed technique is employed, various drawbacks ensure chiefly owing to the difficulty of controlling the high temperature of a reaction which is as a whole exothermic. Consequently, hot spots may form in the catalytic bed, at which side reactions acquire considerable significance.

On the other hand, difficulties with fluidized bed techniques are known, such as instability, so that even slight variations in operational conditions and construction of the reactor may considerably affect both the catalytic bed and progress of the reaction.

Further drawbacks depending upon the constructions of the apparatus are met with when extrapolating from small diameter pilot reactors to commercial reactors the diameter of which is much larger.

It can be shown experimentally that in the catalytic oxidation of olefins in the presence of ammonia, utilizing the catalyst in a fluidized form, the selectivity of the reaction decreases when, other conditions being equal, one goes over from pilot reactors of a height/diameter ratio greater than or equalling about 10/1 to commercial reactors in which the said ratio takes increasingly lower values.

This is probably due to a high mixing index of the materials in large diameter reactors and inherent considerable exchange of the products between the top and bottom of the reactor. This affects the kinetics of reaction, inasmuch as the values of the contact times are purely average, or statistical, which prejudices the selectivity of the reaction.

This drawback could be obviated, for instance, by using a reactor embodying a bundle of tubes of suitable size, in which each tube would act as an independent reactor. However, this arrangement is objectionable from the standpoint of both cost of the apparatus and difficulty in operation.

The invention therefore provides a reactor which avoids the inherent drawbacks of a bundle of tubes, and yields similar or even superior performance to such apparatus.

According to the present invention the reactor is provided with a plurality of exchange tubes arranged vertically, a sufficient number of said tubes externally and symmetrically carrying metal ribs extending parallel to the longitudinal axis of the tube to form externally of the tubes a plurality of vertical catalytic chambers, the height/diameter ratio of each of which ranges between 5/1 and 20/1, preferably 10/1 and 15/1. It should be noted that in this invention the height of the catalytic chambers means the height of the catalyst in the fluidized state.

In a preferred embodiment of the invention the ribs secured to different tubes are not in contact with one another, the rib spacing being about 2–5 mm. The number of ribs secured to each tube generally ranges between 0 and 4.

Figure 2:
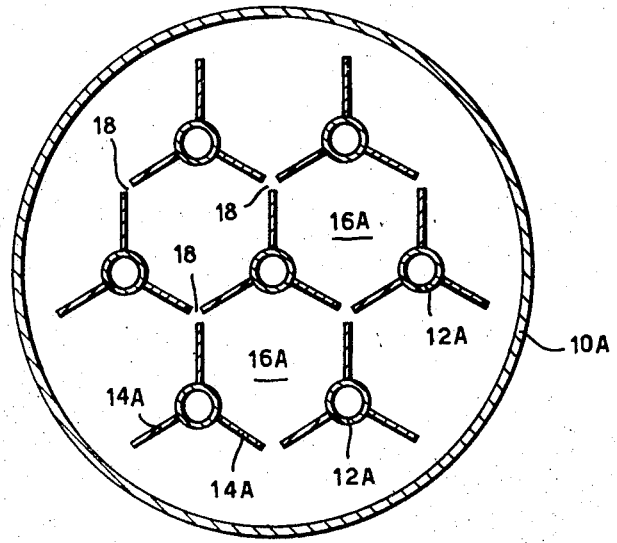

With tubes carrying three ribs arrangements are preferred which form chambers of a hexagonal cross section, as shown in FIG. 2 in which at least three catalytic chambers are formed, whereas with tubes carrying four ribs the preferred arrangement will form chambers of square cross sectional shape as shown in FIG. 1, showing the formation of at least four catalytic chambers. The latter arrangement may be obtained by suitably arranging tubes each carrying two ribs.

A height/diameter, "apparent" ratio may thus be defined for each reactor, which is determined by the height of the catalyst in a fluidized condition and by the diameter of the entire reactor, as well as a height/diameter "real" ratio which is determined in respect of each of the conduits into which the reactor has been subdivided by the height of the fluidized catalyst and the diameter of the circle in which the polygon formed by the ribs is inscribed.

The fundamental advantage of this apparatus is that the various chambers act like a number of independent reactors in respect of each of which the parameters obtained on a monotubular reactor of the same size may be applied.

A low mixing index of the products is afforded in each chamber in order to substantially fully avoid a top to bottom exchange of the materials, though permitting a partial exchange of the catalyst between the various conduits.

The apparatus, which is simple in construction, affords the further advantage of improved control of temperature, and by its special structure avoids erosion and splitting of the catalyst.

The invention further comprises the use of said novel reactor for the preparation of unsaturated aliphatic nitriles, from mono-olefins having 3 to 4 carbon atoms in the molecule, ammonia, and oxygen.

Any catalyst of the above-described type may be employed for the purposes of this process. The reaction temperatures may suitably range between 300 and 550° C., at a pressure equivalent to or slightly exceeding atmospheric pressure.

In the preferred embodiment oxygen in the air is utilized as an oxidizing agent with a molar olefin/oxygen ratio ranging between about 1:1 and 1:2, the reaction mixture being diluted with steam down to about 60% by volume with respect to the feed gases.

The ammonia supply varies in the preferred embodiment from a stoichiometric quantity up to a molar excess not exceeding 10% with respect to olefin. The dwell times of the substances fed to the reactor preferably range between 0.1 and 30 seconds approximately. In any case the conditions are such that the bed is in a fluidized condition with a height/diameter ratio ranging in the preferred embodiment between 10/1 and 15/1, though such ratios may be varied between about 5/1 to 20/1.

The invention will further be understood by reference to the following examples. Examples 1 and 2 illustrate the use of conventional reactors; Example 3 illustrates the use of a reactor according to the present invention.

EXAMPLE 1

A reactor 50 mm. in diameter is charged with an antimony and tin catalyst in a ratio 2.2:1, of a grain size between 48 and 100 mesh. The reaction is carried out at 490° C., the fluidized catalyst being in condition such that the height of the catalystic bed is about 500 mm., the diameter/height ratio being about 10/1.

The feed gases comprise 8% propylene, 8.5% ammonia, 34.5% steam and 50% air by volume. During reaction no over-pressure is applied.

Under these conditions the selectivity of the reaction is such that 65.7% reacted propylene is converted to acrylonitrile, the reacting propylene amounting to 62% with respect to the propylene feed.

EXAMPLE 2

A test is carried out similarly to the first example but utilizing a larger reactor 250 mm. in diameter under conditions such that the diameter/height ratio of he fluidized bed amounts to about 2/1. A temperature of 490° C. is maintained, the composition of the pure reacting gases being as in Example 1. The propylene reacted was 64.5% of the total fed. Of the reacted propylene, 58.3% was converted to acrylonitrile.

EXAMPLE 3

The reactor of the same size of the second example is provided with sixteen 0.5 in. tubes arranged in square symmetry, at 50 mm. centres, each carrying four ribs symmetrically arranged and 15 mm. wide. A stream of molten salts is caused to flow within the tubes in the bundle so as to maintain the reaction temperature at about 490° C. The reaction conditions are such that the "apparent" height/diameter ratio of the fluidized bed amounts to about 2/1 the "real" ratio amounting to 10/1.

With a composition of the reacting gases as in Example 1 a highly selective reaction was obtained, so that 64.5% of the reacted propylene was converted to acrylonitrile.

This example illustrates the efficiency of large-size reactors built according to the present invention.

In the appended drawings, FIGS. 1 and 2 are horizontal cross-sectional views of two embodiments of reactors suitable for carrying out the process according to this invention.

Each of the reactors shown comprises a vertically extending cylindrical shell 10, 10A, respectively, in which a bundle of vertically extending tubes 12, 12A, respectively, is arranged for heat exchange.

In the reactor of FIG. 1 each of the tubes 12 comprises ribs or fins 14 arranged at 90° to each other to define in the shell a system of vertically extending chambers 16 of square-shaped cross-section. In the reactor of FIG. 2 each of the tubes 12A comprises three fins 14A at 120° to each other in an arrangement defining in the shell a system of vertically extending chambers 16A of hexagonal cross-sectional profile. In each of the systems the chambers communicate with each other and with their surrounding space in the shell through vertically extending gaps 18 between the free edges of the fins; the width of said gaps advantageously is from 2 to 5 mm.

What we claim is:

1. In an ammoxidation process for preparing olefinically unsaturated nitriles selected from the group consisting of acrylonitrile and methacrylonitrile comprising
contacting a mono-olefin selected from the group consisting of propene and isobutene, ammonia and an oxidinzing gas in the presence of an ammoxidation catalyst, the improvement which comprises conducting said ammoxidation process at a temperature of from 300–550° C. for from 0.1 to 30 seconds by passing a mixture of said monoolefin, ammonia and oxidizing gas in a molar ratio of mono-olefin:oxidizing gas and mono-olefin:ammonia ranging from 1:1 to 1:2 and 1:1 to 1:1.1, respectively, through a reaction zone, said reaction zone comprising at least three parallel vertically oriented intercommunicating catalytic chambers containing said catalysts in each of said chambers in a fluidized bed, the height to diameter ratio of said bed ranging from 5 to 20.

2. Process as claimed in claim 1, characterized by the fact that air is used as an oxidizing gas.

3. Process as claimed in claim 1, characterized by the fact that the reaction temperatures range between 300° and 450° C.

4. Process as claimed in claim 1, characterized by the fact that an inert gas is present as a diluent with the reacting gases in a quantity of up to 60% by volume.

References Cited

UNITED STATES PATENTS 3,230,246  1/1966  Callahan et al. _____ 260—465.3
3,427,343  2/1969  Callahan et al. _____ 260—465.3
3,472,892  10/1969  Callahan et al. _____ 260—465.3

JOSEPH PAUL BRUST, Primary Examiner